‍

US009649826B2

(12) United States Patent
Swiezkowski et al.

(10) Patent No.: US 9,649,826 B2
(45) Date of Patent: May 16, 2017

(54) ADHESIVE SYSTEM FOR PREPARING LIGNOCELLULOSIC COMPOSITES

(71) Applicants: Henkel IP & Holding GmbH, Duesseldorf (DE); Henkel AG & Co. KGaA, Duesseldorf (DE)

(72) Inventors: Frank Swiezkowski, Hamilton Square, NJ (US); Peter Dolan, Princeton, NJ (US); Carlos Amen-Chen, Oberengstringen (CH); Joseph Gabriel, Buttisholz (CH)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 9 days.

(21) Appl. No.: 14/450,561

(22) Filed: Aug. 4, 2014

(65) Prior Publication Data
US 2015/0050501 A1  Feb. 19, 2015

Related U.S. Application Data

(63) Continuation of application No. PCT/EP2013/075424, filed on Dec. 3, 2013.

(60) Provisional application No. 61/866,103, filed on Aug. 15, 2013.

(51) Int. Cl.
C09J 175/08 (2006.01)
C08K 5/06 (2006.01)
B32B 7/12 (2006.01)
B32B 37/12 (2006.01)
B32B 21/13 (2006.01)
C09J 11/06 (2006.01)
B32B 37/16 (2006.01)
B32B 7/00 (2006.01)
B32B 21/00 (2006.01)
B32B 21/04 (2006.01)
B32B 21/08 (2006.01)
B32B 23/00 (2006.01)
B32B 23/04 (2006.01)
B32B 23/08 (2006.01)
B32B 27/06 (2006.01)
B32B 27/40 (2006.01)
C08G 18/76 (2006.01)
C08G 18/10 (2006.01)
C09J 175/04 (2006.01)
C09J 5/02 (2006.01)

(52) U.S. Cl.
CPC ............ B32B 7/12 (2013.01); B32B 7/00 (2013.01); B32B 21/00 (2013.01); B32B 21/04 (2013.01); B32B 21/042 (2013.01); B32B 21/08 (2013.01); B32B 21/13 (2013.01); B32B 23/00 (2013.01); B32B 23/04 (2013.01); B32B 23/08 (2013.01); B32B 27/06 (2013.01); B32B 27/40 (2013.01); C08G 18/10 (2013.01); C08G 18/7671 (2013.01); C08K 5/06 (2013.01); C09J 5/02 (2013.01); C09J 175/04 (2013.01); B32B 2255/00 (2013.01); B32B 2255/08 (2013.01); B32B 2255/26 (2013.01); B32B 2255/28 (2013.01); Y10T 428/31591 (2015.04)

(58) Field of Classification Search
CPC .. C08G 18/10; C08G 18/307; C08G 18/7671; C09J 175/04; C09J 5/02; C08K 5/06; B32B 21/00; B32B 21/04; B32B 21/042; B32B 21/08; B32B 21/13; B32B 2255/00; B32B 2255/08; B32B 2255/26; B32B 2255/28; B32B 23/00; B32B 23/04; B32B 23/08; B32B 27/06; B32B 27/40; B32B 7/00; B32B 7/12; Y10T 428/31591
USPC ................ 428/425.1; 524/761, 839; 156/327
See application file for complete search history.

(56) References Cited

U.S. PATENT DOCUMENTS 4,148,840 A   4/1979  Shah
4,218,543 A   8/1980  Weber et al.
4,269,994 A   5/1981  Sih
4,374,210 A   2/1983  Ewen et al.
4,390,645 A   6/1983  Hoffman et al.
(Continued)

FOREIGN PATENT DOCUMENTS

DE   4428382 A1   2/1996
EP   2511346 A1   10/2012
(Continued)

OTHER PUBLICATIONS

International Search Report for International Application No. PCT/EP2013/075424 dated Feb. 6, 2014.
(Continued)

Primary Examiner — Thao T Tran
(74) Attorney, Agent, or Firm — James E. Piotrowski

(57) ABSTRACT

An adhesive system for preparing lignocellulosic composites comprising a) an aqueous primer composition and, b) a polyurethane adhesive composition, wherein said aqueous primer composition comprises: from 0 to 25 wt. %, by weight of the composition, of polyol selected from the group consisting of water soluble polyols, water dispersible polyols, water emulsifiable polyols and mixtures thereof, wherein said polyols have a molecular weight less than 5000 daltons; and, up to 10 wt. %, by weight of the composition, of surfactant selected from the group consisting of water soluble surfactants, water emulsifiable surfactants and mixtures thereof, with the proviso that the aqueous primer composition must comprise at least one of said polyol or a surfactant having hydroxyl functionality and a molecular weight of less than 5000 daltons.

18 Claims, No Drawings

(56) References Cited

U.S. PATENT DOCUMENTS

| | | | |
|---|---|---|---|
| 4,463,107 A | 7/1984 | Simroth et al. | |
| 4,565,647 A | 1/1986 | Llenado | |
| 4,574,137 A | 3/1986 | Serratelli et al. | |
| 4,910,279 A | 3/1990 | Gillis et al. | |
| 5,426,142 A * | 6/1995 | Rosano et al. | 524/156 |
| 5,543,487 A | 8/1996 | Vick et al. | |
| 5,585,192 A * | 12/1996 | Sharma et al. | 428/500 |
| 5,728,767 A * | 3/1998 | Kanetou et al. | 524/504 |
| 5,776,872 A | 7/1998 | Giret et al. | |
| 5,883,059 A | 3/1999 | Furman et al. | |
| 5,883,062 A | 3/1999 | Addison et al. | |
| 6,911,239 B2 * | 6/2005 | King et al. | 428/32.25 |
| 8,128,748 B2 | 3/2012 | Sutter et al. | |
| 2004/0103986 A1 | 6/2004 | Hoffmann et al. | |
| 2006/0051595 A1 * | 3/2006 | Gaudeus et al. | 428/423.1 |
| 2006/0211815 A1 * | 9/2006 | Licht | C08G 18/0866 524/591 |
| 2007/0037923 A1 * | 2/2007 | Shiba et al. | 524/556 |
| 2007/0187028 A1 * | 8/2007 | Braun | C09J 5/02 156/281 |
| 2008/0245271 A1 | 10/2008 | Trabesinger et al. | |
| 2008/0283425 A1 | 11/2008 | Trabesinger et al. | |
| 2009/0025851 A1 * | 1/2009 | Huck | C11D 7/14 156/60 |
| 2009/0053411 A1 | 2/2009 | Sutter et al. | |
| 2011/0104073 A1 | 5/2011 | Zeng et al. | |
| 2012/0114928 A1 | 5/2012 | Jiang et al. | |
| 2013/0136916 A1 * | 5/2013 | Otero Martinez | B32B 27/065 428/317.7 |

FOREIGN PATENT DOCUMENTS

| | | | |
|---|---|---|---|
| GB | 848671 A | | 9/1960 |
| GB | 874430 A | | 8/1961 |
| GB | 889050 A | | 2/1962 |
| JP | 62120486 A | * | 6/1987 |
| WO | 03093385 A2 | | 11/2003 |
| WO | 2006125731 A1 | | 11/2006 |
| WO | 2007095670 A1 | | 8/2007 |
| WO | 2007140858 A1 | | 12/2007 |

OTHER PUBLICATIONS

C.B. Vick and E.A. Okkonen, "Strength and Durability of One-Part Polyurethane Adhesive Bonds to Wood," Forest Products Journal, 48 (11-12), 1999, pp. 71-76.

Custodio et al., "A Review of Adhesion Promotion Techniques for Solid Timber Substrates," The Journal of Adhesion 84, 2008, pp. 502-529.

* cited by examiner

ADHESIVE SYSTEM FOR PREPARING LIGNOCELLULOSIC COMPOSITES

FIELD OF THE INVENTION

This application is directed to an adhesive system suitable for preparing lignocellulosic composites. More particularly, the application is directed to an adhesive system comprising a primer composition which is used to treat the surface of a lignocellulosic substrate prior to the application of a polyurethane adhesive composition thereto.

BACKGROUND OF THE INVENTION

The durability of adhesives for wood structural purposes is closely regulated by, for instance, the American National Standards Institute (ANSI); the American Society for Testing Materials (ASTM) and the Canadian Standards Association (CSA). Polyurethane adhesives must meet these standards if they are to find utility as adhesives in structural wood products.

C. B. Vick and E. A. Okkonen in *Strength and Durability of One-Part Polyurethane Adhesive Bonds to Wood*, Forest Products Journal, 48 (11-12), 1999, pages 71-76, showed that, whilst the dry adhesion strength of polyurethane adhesives to wood is comparable to other adhesive chemistries, the level of wood failure after humidity exposure is often unsatisfactory. Given that such wood failure is an important requirement included in inter alia the Canadian Standard Association Norm CSA 112.9 for structural wood adhesives intended for exterior exposure, recent research has focused on improving the wet adhesion strength of polyurethane adhesives.

Custodio et al. in "*A Review of Adhesion Promotion Techniques for Solid Timber Substrates*", The Journal of Adhesion 84, 2008, pages 502-529 proposes a number of adhesion improvement techniques for wood elements, including for instance corona discharge and flame treatments. However for practical, safety and environmental reasons, a number of authors have focused on the use of primers which are used to treat the surface of the wood prior to the application of the adhesive composition thereto.

International Patent Application Publication No. WO03/093385 (Huntsman International LLC) discloses the optional use of a surface treatment solution for the adhesion improvement of 1-component (1K) polyurethane adhesives on Southern Yellow Pine and Douglas Fir. These surface treatments may comprise aqueous solutions comprising from 0.05 to 10% by weight of either urea, polyvinylalcohol, salts of dodecylbenzene sulfonic acid or copolymers of ethylene with vinyl acetate. Whilst this document finds that urea solutions gave good results on Southern Yellow Pine—meeting the norms set by the ASTM D2559 on wood delamination—these solutions were not effective on Douglas Fir. Furthermore, this document teaches that the wood to which the surface treatment is applied must first be planed and sanded; without the sanding step, the aqueous solutions did not promote the polyurethane adhesive strength to the extent necessary to pass the wet exposure requirements of ASTM D2559. And it is noted that sanding is not usually carried out at plant scale nor is it allowed by official norms for structural wood products.

U.S. Pat. No. 5,543,487 (Vick et al.) discloses a hydroxymethylated resorcinol coupling agent including a formaldehyde-based, hydroxymethylated resorcinol as an active ingredient, which enables commercial thermosetting adhesives, such as bisphenol-A epoxy, phenol-resorcinol-formaldehyde, emulsion-polymer isocyanate, phenol-formaldehyde and resorcinol-formaldehyde, to develop bonds to a variety of untreated and preservatively treated woods. To form the coupling agent, formaldehyde and resorcinol are reacted under mildly alkaline conditions in situ for between 4 and 6 hours at a temperature between 65° and 85° F. before application to wood surfaces at the very high spread rate of 150 g/m$^2$. In toto the bonding process of this document takes of the order of days and is too slow for economical application in a production plant. Moreover, the reactant formaldehyde is a known human carcinogen and its use necessitates precautionary and expensive plant construction.

International Patent Application Publication No. WO2007/095670 (Commonwealth Scientific and Industrial Research Organisation) relates to a waterborne primer composition comprising polyamine—preferably a polyethyleneimine of molecular weight in the range of from 500 to 3 million—and having a pH of at least 11.5. The document also relates to a method of improving the bonding of wood with coatings such as electrostatic coatings and to adhesives using this primer composition. In the enabled embodiments of this document, the wood specimens required sanding prior to the application of the primer: this is problematic for the reasons noted above and perhaps more so here as it is a two-step sanding process consisting of coarse sanding using first a coarse 80-grit sanding paper followed by fine sanding with a 150-grit sanding paper. Furthermore, whilst the dry tensile strength of the primer-containing samples improved clearly, the citation fails to report any results regarding wet adhesion strength, delamination or heat resistance as required by structural use standards.

There thus remains a need to develop a primer composition which can be used to enhance the adhesion strength, in particular the wet adhesion strength of a polyisocyanate adhesive composition within an adhesive system which does not suffer the aforementioned disadvantages of the prior art.

STATEMENT OF THE INVENTION

In a first aspect of the present invention, there is provided an adhesive system for preparing lignocellulosic composites comprising:
  an aqueous primer composition; and,
  a polyurethane adhesive composition,
  wherein said aqueous primer composition comprises:
  up to 10 wt. %, by weight of the composition, of surfactant selected from the group consisting of water soluble surfactants, water emulsifiable surfactants and mixtures thereof; and,
  from 0 to 25 wt. %, by weight of the composition, of polyol selected from the group consisting of water soluble polyols, water dispersible polyols, water emulsifiable polyols and mixtures thereof, wherein said polyols have a molecular weight less than 5000 daltons,
  with the proviso that the aqueous primer composition must comprise at least one of said polyol or a surfactant having hydroxyl functionality and a molecular weight less than 5000 daltons.

In a specific embodiment of this adhesive system, the aqueous primer composition comprises: up to 5 wt. %, preferably up to 1 wt. %, by weight of the composition, of surfactant selected from the group consisting of water soluble surfactants, water emulsifiable surfactants and mixtures thereof; and, up to 20 wt. %, preferably up to 5 wt. %, by weight of the composition, of polyol selected from the group consisting of water soluble polyols, water dispersible polyols, water emulsifiable polyols and mixtures thereof.

In a further, independent embodiment of the adhesive system, the polyurethane adhesive composition is a moisture-curable, one-component polyurethane adhesive composition. This one-component polyurethane adhesive composition should preferably comprise: at least one prepolymer having free NCO groups, said prepolymer being obtainable from at least one component A comprising a compound reactive toward isocyanates and at least one component B comprising an isocyanate; from 0 to 40% by weight, preferably from 0.1 to 30% by weight, of filler; from 0 to 20% by weight of customary additives and assistants; and, from 0 to 20% by weight of an activator.

It is noted that good results have been obtained in an adhesive system where the one-component polyurethane adhesive composition, to be applied after the aqueous primer composition, comprises at least one prepolymer having free NCO groups which is characterized by: i) an NCO content of from 5 to 30%, preferably from 10 to 25% by weight, based on the prepolymer; ii) a functionality of from 2.0 to 3, preferably from 2.2 to 2.9; and, iii) a viscosity at 20° C. of from 300 to 35,000 mPa·s, preferably from 1000 to 10,000 mPa·s.

It is envisaged that the adhesive composition may contain more than one prepolymer. Whilst the second or further prepolymers need not meet the characterizing features i) to iii) above, it is preferred that the averaged properties of the prepolymers do meet these characterizations. Optimally, each included prepolymer should meet these characterizations.

In accordance with a second aspect of the invention, there is provided a process for preparing a lignocellulosic bonded article comprising the steps of:

(a) providing at least two lignocellulosic surfaces;
(b) providing an adhesive system as defined above;
(c) applying said adhesive system to at least a portion of at least one of the lignocellulosic surfaces; and
(d) contacting the at least one lignocellulosic surface with another lignocellulosic surface under conditions suitable for forming an adhesive bond there-between.

In a specific embodiment of this process, step c) thereof comprises applying the primer composition to at least a portion of at least one of the lignocellulosic surfaces; and, after a period of up to 15 minutes, preferably from 1 to 5 minutes, applying said polyurethane adhesive composition to said portion(s) of the lignocellulosic surface(s).

The application of the primer composition to the lignocellulosic surface serves to improve the adhesion strength and specifically the wet adhesion strength of the subsequently applied polyurethane adhesive composition. This enables the lignocellulosic article obtained by the above defined process to meet the standards set for structural wood products. In particular, the lignocellulosic articles can meet or surpass the requirements of European Standard EN 391: 2001, Canadian Standard Association (CSA) Standard 112.9 and/or American Society for Testing Materials (ASTM) D2259.

In a further aspect of the invention there is provided the use as a primer in an adhesive system for lignocellulosic materials of an aqueous composition comprising: i) from 0 to 25 wt. %, by weight of the composition, of polyol selected from the group consisting of water soluble polyols, water dispersible polyols, water emulsifiable polyols and mixtures thereof; and, ii) up to 10 wt. %, by weight of the composition, of surfactant selected from the group consisting of water soluble surfactants, water emulsifiable surfactants and mixtures thereof, with the proviso that the aqueous composition must comprise at least one of said polyol or a surfactant having hydroxyl functionality and a molecular weight less than 5000 daltons. The selected water-soluble, water emulsifiable or water-dispersible polyols should have a molecular weight less than 5000 daltons.

DEFINITIONS

As used herein EN 391 refers to European. Standard EN 391:2001 entitled "*Glued laminated timber—Delamination test of glue lines*".

As used herein CSA 112.9 refers to Canadian Standard Association (CSA) Standard 112.9 entitled "*Standard SpecOcation for Evaluation of Adhesives for Structural Wood Products (Exterior Exposure)*".

As used herein ASTM D2559 refers to American Society for Testing Materials ASTM Standard D2559-04 entitled "Standard Specification for Adhesives for Structural Laminated Wood Products for Use Under Exterior (Wet Use) Exposure Conditions".

As used herein ASTM D5751 refers to American Society for Testing Materials ASTM Standard D5751-99 (2012) entitled "*Standard Specification for Adhesives Used for Laminate Joints in Nonstructural Lumber Products*".

As used herein ANSI 405-2008 refers to American National Standards Institute ANSI Standard 405-2008 entitled "*Standard for Adhesives for Use in Structural Glued Laminated Timber*".

The recital of HLB herein refers to calculated HLB values. These are calculated according to the methodology of W. C. Griffin "*Calculation of HLB Values of Non-Ionic Surfactants*," Journal of the Society of Cosmetic Chemists 5 (1954): 249. For bended components, the HLB value will be the weighted average of the HLB values for each component.

As used herein "an active hydrogen moiety" refers to a moiety containing a hydrogen atom which, because of its position in the molecule, displays significant activity according to the Zerewitnoff Test described by Wohler in Journal of the American Chemical Society, Vol. 49, p. 3181 (1927).

As used herein, the term "surfactant" means a compound that, when dissolved in a liquid, reduces the surface tension of the liquid, which reduces the interfacial tension between two liquids or which reduces surface tension between a liquid and a solid. More typically the term "surfactant" is used herein to refer to a compound that, when dissolved in water, reduces the surface tension of the water.

Unless otherwise stated, the term molecular weight as used herein for oligomeric, polymeric and co-polymeric species refers to weight average molecular weight (Mw) as determined using gel permeation chromatography according to the protocol found in Colloids and Surfaces A. Physico Chemical & Engineering Aspects, Vol. 162, 2000, pg. 107-121.

The term "polyol" as used herein shall include diols and higher functionality hydroxyl compounds.

The hydroxyl (OH) values given herein are measured according to Japan Industrial Standard (JIS) K-1557, 6.4.

The isocyanate content values given herein are measured according to EN ISO 11909.

Viscosities of the adhesive compositions and of prepolymers as described herein are determined according to the following procedure: measured using the Brookfield Viscometer, Model RVT at standard conditions of 20° C. and 50% Relative Humidity (RH). The viscometer is calibrated using silicone oils of known viscosities, which vary from 5,000 cps to 50,000 cps. A set of RV spindles that attach to the viscometer are used for the calibration. Measurements of the prepolymer are done using the No. 6 spindle at a speed of 20 revolutions per minute for 1 minute until the viscometer equilibrates. The viscosity corresponding to the equilibrium reading is then calculated using the calibration.

As used herein the term "lignocellulosic material" is intended to mean a woody material, including but not limited to: wooden boards; chemically treated wooden boards, for example acetylated wooden boards; wood veneers; wood fibers; wood strips; wood flakes; wood particles; comminuted agricultural wastes such as rice hulls, baggasse and straw; other wood based composites; and, combinations thereof.

DETAILED DESCRIPTION OF THE INVENTION

The invention will now be described with reference to a number of more detailed embodiments.
Primer Composition The aqueous primer composition of the present invention comprises:

up to 10 wt. %, by weight of the composition, of surfactant selected from the group consisting of water soluble surfactants, water emulsifiable surfactants and mixtures thereof; and, from 0 to 25 wt. %, by weight of the composition, of polyol selected from the group consisting of water soluble polyols, water dispersible polyols, water emulsifiable polyols and mixtures thereof, wherein said polyols have a molecular weight of less than 5000 daltons, with the proviso that the composition must comprise at least one of said polyol or a surfactant having hydroxyl functionality and a molecular weight of less than 5000 daltons.

It will of course be recognized that certain surfactants may have hydroxyl functionality. The primer composition may therefore consist of an aqueous solution or emulsion of one or more surfactants having hydroxyl functionality and of which surfactants at least one must have a molecular weight of less than 5000 daltons.

Alternatively, the primer composition may comprise polyol in combination with at least one surfactant which may or may not have hydroxyl functionality and which may or ay not have a molecular weight less than 5000 daltons. In this embodiment, the aqueous primer composition may comprise:

up to 5 wt. %, preferably up to 1 wt. %, by weight of the composition, of surfactant selected from the group consisting of water soluble surfactants, water emulsifiable surfactants and mixtures thereof; and, up to 20 wt. %, preferably up to 5 wt. %, by weight of the composition, of polyol selected from the group consisting of water soluble polyols, water dispersible polyols, water emulsifiable polyols and mixtures thereof.

The primer composition will usually comprise at least 80 wt. % and more typically at least 90 wt. %, by weight of the composition, of water. This water can be tap water, de-ionized water, de-mineralized water or a mixture thereof.

The primer composition of the present invention may optionally comprise up to 10 wt. % (based on the total weight of the composition) of a co-solvent. This co-solvent should operate to diminish the raising of the natural grain of the wood substrate to which the composition is applied; in the absence of co-solvents, very high water content in the applied composition can promote this raising of the grain. Importantly, the selected co-solvent should not react with surfactant present in the composition. Suitable co-solvents include texanol and methoxypropoxypropanol (Solvenon DPM).

The primer composition should have a pH whereby it does not cause acid wood damage nor does it discolor the wood, as is known with strongly alkaline compositions. In practice, the primer composition should typically have a pH in the range from 6 to 8 and preferably from 6.5 to 7.5.

The aqueous primer compositions are formulated by simple mixing of the various components. This mixing may occur well in advance of the application of the composition to the surface of the substrate: the aqueous composition would thus be applied to the surface of the substrate as a prepared solution. In alternative embodiment, the aqueous composition can be prepared within a rinse stream just prior to or during contact with the substrate surface. For example, a certain quantity of the surfactants and/or polyols can be injected into a continuous stream of water and, optionally, co-solvent to form the aqueous primer compositions.
Surfactant The primer composition comprises up to 10 wt. %, normally up to 5 wt. % and preferably from 0.01 to 1 wt. % of surfactant selected from the group consisting of water soluble surfactants, water emulsifiable surfactants and mixtures thereof.

The choice of such surfactants is not intended to be limited: for instance, the surfactant may or may not contain functional groups which are reactive to isocyanate moieties. They may have a number average molecular weight (Mn) of up 100,000 g/mol although more usually the surfactants will have a number average molecular weight (Mn) of from 400 to 25000 or 5000, as determined by means of gel permeation chromatography against a polystyrene standard. Surfactants meeting criteria such as these can be found, for instance, in *Surfactants and Interfacial Phenomena*, Second Edition, M. J. Rosen, 1989, John Wiley and Sons, Inc., New York, pages 1-32, the entire disclosure of which is incorporated herein by reference.

The preferred surfactants of the present invention are selected from the group consisting of: siloxane based surfactants; alkyl polyglucosides, including alkylpolysaccharides; alkoxylated fatty acids; alkoxylated alcohols; alkylsufosuccinates; acetylenic diols; and, mixtures thereof.

Suitable siloxane-based surfactants include silicon surfactants compatible with aqueous systems. Such surfactants include, but are not limited to, silicone polyoxyalkylene copolymers, organosilicone-polyether copolymer surfactants, and the like. In certain embodiments, preferred siloxane-based surfactants include BYK® surfactants available from BYK Chemie GmbH and Tego® surfactants available from Evonik Industries, of which BYK® 347 and 348 and Tego® Wet 280 and Wet 265 might be specifically noted. Other silicon surfactants can be identified for example in Hill (1999) Silicon Surfactants, Marcel Decker, N.Y.

As noted, the primer composition may contain one or more alkyl polyglucoside surfactants which may preferably have a naturally derived alkyl substituent, such as coconut fatty alcohol or a distilled cut of a natural fatty alcohol. Suitable alkyl polyglucoside surfactants, including alkylpolysaccharides, are disclosed in inter alia U.S. Pat. No. 5,776,872 (Giret et al.); U.S. Pat. No. 5,883,059 (Furman et al.); U.S. Pat. No. 5,883,062 (Addison et al.); and, U.S. Pat. No. 4,565,647 (Llenado). And exemplary commercially available alkyl polyglucosides surfactants include: Triton® CG110 available from Dow Chemical Company; AG6202® available from Akzo Nobel; and, Alkadet 15® available from Huntsman Corporation.

Alkylsulfosuccinate surfactant compounds are well-known and include the salts of mono-esters of sulfosuccinic acid, the salts of di-esters of sulfosuccinic acid—each of which may, optionally, be alkoxylated—as well as mixtures thereof. Exemplary sulfosuccinate surfactant compounds include disodium monooctylsulfosuccinate, sodium dioctylsulfosuccinate, disodium lauryl sulfosuccinate, disodium laureth sulfosuccinate, disodium laurimide (MEA) sulfosuccinate, disodium mono-alkylphenyl ether sulfosuccinate, and mixtures thereof.

Alkoxylated fatty acid surfactants are also well-known in the art. Generally the fatty acid portion of such alkoxylated fatty acid surfactants is derived from a saturated or unsaturated mono- or di-fatty acids, typically a $C_6$-$C_{30}$ fatty acid such as lauric acid, myristic acid, palmitic acid, stearic acid, oleic acid, linoleic acid, behenic acid, erucic acid. Such acids may be derived from vegetable oils, such as, for example, tall oil, rapeseed oil, canola oil, soy oil, coconut oil, castor oil, corn oil, olive oil, sunflower oil, cottonseed oil, palm oil, peanut oil, sesame oil, safflower oil, linseed oil, flax seed oil, palm kernel oil, and mixtures thereof. These fatty acids are alkoxylated with from 2 to 20 moles, more typically from 5 to 20 moles of a $C_2$-$C_4$ alkylene oxide, more typically, ethylene oxide.

Appropriate alkoxylated alcohol surfactant compounds for use in the present invention include but are not limited to ethoxylated (15) tridecyl alcohol, ethoxylated (7) lauryl alcohol, ethoxylated (20) oleyl alcohol, ethoxylated (15) stearyl alcohol, and mixtures thereof.

Acetylenic diol-based surfactants are surfactants which can be acetylenic diols comprising hydrophobic groups at the end of the acetylenic spacer and hydrophilic and/or hydrophobic ethers hanging off of the hydroxyl groups. Examples of acetylenic diol-based surfactants include, 2,4,7,9-tetramethyl-5-decyne-4,7-diol (TMDD), 2,5,8,11-tetramethyl-6-dodecyne-5,8-diol, their derivatives, and their mixtures. And valued examples of commercial acetylenic diol-based surfactants include the Dynol series (e.g. Dynol 604) and Surfynol series available from Air Products & Chemicals.

In accordance with a preferred embodiment of the present invention, the surfactant of the primer composition is a mixture of alkylsufosuccinates and acetylenic diols commercially available under the trade name Surfynol PSA-336 from Air Products & Chemicals.

Polyol

The primer composition comprises up to 25 wt. %, normally up to 20 wt. % and preferably from 0.1 to 5 wt. % of polyol selected from the group consisting of water soluble polyols, water dispersible polyols, water emulsifiable polyols and mixtures thereof. The water soluble, water dispersible or water-emulsifiable polyols are di- or poly-functional hydroxy or polymeric compounds having a molecular weight of less than 5000 daltons and preferably less than 2000 daltons. Typically the selected polyols should be stable at temperatures up to 120° C. Further, in a preferred embodiment, the polyol is characterized by a hydrophilic-lipophilic balance (HLB), as defined by Griffin below, of at least 10, for example 12 or higher.

Nonexclusive examples of suitable polyols include ethylene glycol, diethylene glycol, triethylene glycol, propylene glycol, dipropylene glycol, 1,2-butanediol, 1,3-butanediol; 1,4-butanediol or tetramethylene glycol, 2,3-butanediol, 1,4-hexanediol, pentamethylene glycol, hexamethylene glycol, neopentyl glycol, hexylene glycol, pentaerythritol, dispentaerythritol and, trimethyol propane.

The polyols may equally comprise polyalkylene glycols having the formula $HO(CH_2CH_2O)_nH$ or $HO(CH_2CH_2CH_2O)_nH$ wherein n is a positive integer of from 2 to 30, or more usually from 2 to 25. And the use of glycol esters of fatty acids, such as lauric, palmitic, stearic, and myristic acids, might also be mentioned.

The use of amine polyols is also not precluded. This group includes the low molecular weight polyols, such as diethanol amine, triethanol amine and N-methyl-N,N'-diethanol amine, but also amine polyols obtained by the addition reaction of an amino compound such as ethylenediamine, 1,3-propanediamine and 1,6-hexanediamine with an alkylene oxide (e.g., propylene oxide (PO) and ethylene oxide (EO).

In another embodiment of the invention, the polyols include monosaccharides, which are glycerols (trihydric monosaccharides having three hydroxyl groups), sugar alcohols (having more than three hydroxyl groups) and oligosaccharides. And in a still further embodiment, the polyols may be acids, acid salts, fatty acids (alkyl glycosides), and alcohol, alkyl and amine derivatives (glycosylamines) of monosaccharides and oligosaccharides.

Specific examples of polyols falling within these definitions include, but are not limited to, mannitol, sorbitol, xylitol, glycerol, glucose, fructose, maltose, lactose, tagatose, psicose, galactose, xylose, allose, ribose, arabinose, rhamose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethyl-hexo glucoside, methyl-hexa glucoside, aldaric acid, sodium aldarate, glucaric acid, sodium glucarate, gluconic acid, sodium gluconate, glucoheptonic acid, sodium glucoheptonate, and mixtures thereof. It will be appreciated that derivatives of these relatively simple polyols will also find use in the inventive methods and compositions. Suitable derivatives include, but are not necessarily limited to, acid, acid salt, alcohol, alkyl, and amine derivatives of these saccharides, and mixtures of polyols and/or the derivatives thereof. Specific examples of suitable derivatives include, but are not necessarily limited to, alkyl glucosides, alkyl polyglucosides, alkyl glucosamides, alkyl glucosamines, alkyl sorbitans, alkyl sorbitols, alkyl glucopyranosides, alkyl maltosides, alkyl glycerols and mixtures thereof.

Illustrative commercial polyols which have found utility in the present invention include: Tween™ 20, Tween™ 81 and Synperonic™ T-304 and T-701, available from Croda International; Simulsol™ ADM 21, available from Seppic; Quadrol™ L from BASF AG; and, Surfynol™ PSA-336 available from Air Products and Chemicals Incorporated.

One-Component Polyurethane Composition

In a preferred embodiment of the adhesive system of the present invention, a one-component polyurethane adhesive composition comprising a prepolymer having free NCO groups is employed. More particularly, that one-component polyurethane adhesive composition should comprise:

a prepolymer having free NCO groups, said prepolymer being obtainable from at least one component A comprising a compound reactive toward isocyanates and at least one component B comprising an isocyanate;

from 0 to 40% by weight, preferably from 0.1 to 30% by weight, of filler;

from 0 to 20% by weight of customary additives and assistants; and, from 0 to 20% by weight of an activator.

The prepolymers should have an average isocyanate functionality which is sufficient to allow the preparation of a crosslinked polyurethane upon cure but not so high that the polymers are unstable. Stability in this context means that either the prepolymer or the adhesive composition prepared from the prepolymer has a shelf life of at least 2 months at ambient temperatures, in that it does not demonstrate an increase in viscosity during such period which prevents its application or use. Preferably the prepolymer or adhesive composition prepared therefrom does not undergo an increase in viscosity of more than about 50 percent during the stated period.

Generally the average isocyanate functionality of the prepolymer is at least about 2.2 and preferably at least about 2.4; below about 2.2 the adhesives obtained upon crosslinking of the prepolymer tend to be too soft or elastic and in, some instances, the strength of the cured adhesive is compromised. Further, the average isocyanate functionality of the prepolymer is generally 3.2 or less, and more preferably 2.9 or less; above 3.2 average isocyanate functionality the prepolymer and adhesives prepared from the prepolymer may exhibit unacceptable stability.

The prepolymer may also be characterized by its NCO content which should be at a level which facilitates acceptable strength in adhesives prepared from the prepolymers after 60 minutes and stability of the prepolymer. The NCO isocyanate content should typically be in the range from 5 to 30% by weight of the prepolymer, preferably be from 10 to 25% by weight, and more preferably be from 15 to 25% by weight. Above 5% by weight the adhesives compositions prepared from the prepolymer may demonstrate lap shear strengths after 60 minutes which are too low for the intended use and some foaming during cure of the adhesive composition prepared from the prepolymer may occur; below about 5% by weight isocyanate content, the prepolymer may exhibit instability, such as gelling within 1 to 3 days.

The prepolymer should exhibit a viscosity which facilitates the formulation of a stable, pumpable, non-gelling adhesive composition which has good green strength. In this regard, the viscosity of the prepolymer should generally be from 300 to 35,000 mPa·s, preferably be from 10,000 to 30,000 mPa·s, and more preferably be from 1,000 to 10,000 mPas. The viscosity of the adhesive composition can of course be adjusted with fillers but these cannot contribute to the green strength of the final adhesive.

Collectively, the prepolymer should preferably be characterized by: i) an NCO content of from 5 to 30%, preferably from 10 to 25% by weight, based on the prepolymer; ii) a functionality of from 2.2 to 3.2, preferably from 2.2 or 2.4 to 2.9; and, iii) a viscosity at 20° C. of from 300 to 35,000 mPa·s, preferably from 10,000 to 10,000 mPa·s. These properties may be found by using known commercially available prepolymers. Alternatively, components A and B may be reacted in a ratio and under conditions such that these properties of the resultant prepolymer are achieved.

The polyisocyanates (B) used in preparing the prepolymer include any aliphatic, cycloaliphatic, arylaliphatic, heterocyclic or aromatic polyisocyanate, or mixture thereof, having an average isocyanate functionality of at least about 2.0 and an equivalent weight of at least about 80. The isocyanate functionality of the polyisocyanate will more generally be from about 2.2 to 4.0, for example 2.3 to 3.5. Whilst functionalities greater than 4.0 may be used, their use can cause excessive crosslinking, resulting in an adhesive composition which is too viscous to handle and apply easily; further, the cured adhesive may be too brittle and cause foaming due to carbon dioxide gassing. The equivalent weight of the polyisocyanate is typically from 100 to 300, preferably from 110 to 250, and more preferably from 120 to 200.

The polyisocyanates, where required, may have been biuretized and/or isocyanurated by generally known methods, such as described in UK Patent No. 889,050.

Examples of suitable polyisocyanates include but are not limited to: ethylene diisocyanate; 1,4-tetramethylene diisocyanate; hexamethylene diisocyanate (HDI); biuret or trimers of HDI; 1,12-dodecane diisocyanate, cyclobutane-1,3-diisocyanate cyclohexane-1,3- and 1,4-diisocyanate and mixtures of these isomers; 1-isocyanato-3,3,5-trimethyl-5-isocyanato methyl cyclohexane; 2,4- and 2,6-hexahydrotolylene diisocyanate and mixtures of these isomers; hexahydro1,3- and/or 1,4-phenylene diisocyanate; perhydro-2,5'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate (MDI); naphthylene-1,5-diisocyanate; triphenyl methane-4,4',4'-tri-isocyanate; and, polyphenyl polymethylene polyisocyanates of the type obtained by condensing aniline with formaldehyde, followed by phosgenation such as described in UK Patent Nos. 874,430 and 848,671.

Di- and/or polyisocyanates comprising ester, urea, allophanate, carbodiimide, uretdione and/or urethane groups may also be used in the process according to the invention.

In an embodiment, diphenyl methane diisocyanate (methylene diphenyl diisocynate, MDI), as polymeric or monomeric MDI, is used for the preparation of the prepolymer. Preferably that MDI is in monomeric form, with either 4,4'-MDI or mixtures of 2,4'-MDI and 4,4'-MDI being particularly preferred.

The term isocyanate-reactive compound (A) as used herein includes water and any organic compound having, on average, more than one and preferably from 2 to 4 isocyanate-reactive moieties. These are generally imino-functional compounds or compounds containing an active hydrogen moiety. Suitable imino-functional compounds are those which have at least one terminal imino group per molecule, such as are described in U.S. Pat. No. 4,910,279, the disclosure of which is incorporated herein by reference in its entirety. Illustrative of active hydrogen moieties are —COOH, —OH, —NH$_2$, —NH—, —CONH$_2$, —SH, and —CONH and typical active hydrogen-containing compounds include polyols, polyamines, polymercaptans, polyacids and compounds containing at least one oxazolidine moiety.

The preferred isocyanate-reactive compounds for use in the present invention are polyols and in particular polyols having from 2 to 4 isocyanate-reactive hydroxyl moieties. The polyol may, for instance, be a mixture of one or more diols and one or more triols. And the polyols may include polyether polyols, polyester polyols, poly(alkylene carbonate)polyols, hydroxyl-containing polythioethers, polymer polyols, and mixtures thereof. The hydroxyl number of the polyhydroxy compounds is as a rule from 20 to 850 mg KOH/g and preferably from 25 to 500 mg KOH/g.

Whilst diols and triols of low molecular weights, for instance from 60 to 400 or 300, may be reactive towards isocyanates, these polyols are more typically used as starter molecules, chain extenders and/or crosslinking agents in a reaction mixture which contains one or more further active hydrogen compounds. In this regard, mention may be made: aliphatic, cycloaliphatic and/or aralipatic diols having from 2 to 14 and preferably from 4 to 10 carbon atoms, such as ethylene glycol, 1,3-propanediol, 1,4-butanediol, 1,6- hexanediol, 1,10-decanediol, o-, m- and p-dihydroxycyclohexane; diethylene glycol; dipropylene glycol; bis(2-hydroxyethyl)hydroquinone; and, triols, such as 1,2,4-, and 1,3,5-trihydroxycyclohexane, glycerol and trimethylolpropane.

Polyether polyols are well-known in the art and include polyoxyethylene, polyoxypropylene, polyoxybutylene, and polytetramethylene ether diols and triols. The polyether polyols may generally have molecular weights of from 400 to 10 000, for example from 1000 to 7000, and be prepared by polymerizing alkylene oxides in the presence of an active hydrogen-containing initiator compound, as described in U.S. Pat. Nos. 4,269,9945, 4,218,543 and 4,374,210 for instance. The alkylene oxide monomers are typically selected from the group consisting of: ethylene oxide; propylene oxide; butylene oxides; styrene oxide; epichlorohydrin; epibromohydrin; and, mixtures thereof. The active hydrogen initiators are in turn typically selected from the group consisting of: water; ethylene glycol; propylene glycol; butanediol; hexanediol; glycerin; trimethylol propane; pentaerythritol; hexanetriol; sorbitol; sucrose; hydroquinone; resorcinol; catechol; bisphenols; novolac resins; phosphoric acid; amines; and mixtures thereof. Good examples of polyether polyols which are useful preparing the polyurethane prepolymer of the present invention are the ethylene oxide-capped polyols prepared by reacting glycerine with propylene oxide, followed by reacting the product with ethylene oxide.

As is known in the art, polyester polyols may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of polyhydric alcohols which are useful in preparing polyester polyols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof. As regards the present invention, useful polyester polyols will typically have molecular weights of from 1200 to 3000.

The use of amine polyols as the active hydrogen moiety is not precluded. This group includes the low molecular weight polyols, such as diethanol amine, triethanol amine and N-methyl-N,N'-diethanol amine, but also amine polyols obtained by the addition reaction of an amino compound such as ethylenediamine, 1,3-propanediamine and 1,6-hexanediamine with an alkylene oxide (e.g., propylene oxide (PO) and ethylene oxide (EO). As examples of suitable amine polyols, or specifically ethylene diamine-initiated polyols, may be mentioned those under the Synerponic™ T brand polyols and Synerponic™ V304 polyol (available from Croda International).

Polymer polyols which find utility as the active hydrogen moiety (A) include dispersions of (co)polymers of vinyl monomers in a continuous polyol phase as described in inter alia U.S. Pat. Nos. 4,390,645, 4,463,107, 4,148,840 and 4,574,137. Also useful are styrene/acrylonitrile (SAN) copolymer polyols, polyisocyanate polyaddition (PIPA) polyols (dispersions of polyurea-polyurethane particles in a polyol) and the polyurea dispersions in polyols (PHD polyols).

In an embodiment of the present invention, the reactant polyol(s) have an average functionality of at least 1.5, preferably at least 1.8 and more preferably at least 2.0, but no greater than 4.0, preferably no greater than about 3.5 and more preferably no greater than 3.0. Independently or additionally, the equivalent weight of the reactant polyol(s) is at least 200, preferably at least 500 and more preferably at least about 1,000 but no greater than 3500, preferably no greater than 3000 and more preferably no greater than 2500.

The polyols are present in an amount sufficient to react with most of the isocyanate groups of the isocyanates leaving enough isocyanate groups to correspond with the desired free isocyanate content of the prepolymer. And in that embodiment where the polyols comprise a mixture of diols and triols, the proportion of diol to triol must be chosen to achieve the desired isocyanate functionality of the prepolymer.

Starting from components A and B as defined above, the polyurethane prepolymer may be prepared by any suitable method, such as bulk polymerization and solution polymerization. The reaction to prepare the prepolymer is carried out under anhydrous conditions, for instance under a nitrogen blanket, to prevent cross-linking of the isocyanate groups by atmospheric moisture.

In a standard prepolymer synthesis, the compounds or polymers containing isocyanate-reactive groups are first heated in the absence of catalyst to a temperature of from 45 to 55° C. The polyisocyanate is then added under mixing to ensure it is evenly dispersed in the reaction mixture. Thereafter a polyurethane catalyst may be added. After addition of the catalyst, an exotherm generally results; in this case, the temperature of the reaction mixture may have to be lowered to ensure that it is does not gel. Plasticizer may be added after the exotherm recedes to dilute the reactants and quench the reaction. The reaction should be run such that all free isocyanate-reactive moieties are reacted with isocyanate moieties.

Standard polyurethane catalysts include: the stannous salts of carboxylic acids, such as stannous octoate, stannous oleate, stannous acetate, and stannous laureate; dialkyltin dicarboxylates, such as dibutyltin dilaureate and dibutyltin diacetate; tertiary amines; alkanolamine compounds; 2,3-dimethyl-3,4,5,6-tetrahydropyrimidine; tetraalkylammonium hydroxides; alkali metal hydroxides; alkali metal alcoholates; and, tin mercaptides. Depending on the nature of the isocyanate, the amount of catalyst employed is generally in the range from 0.005 to 10% by weight of the mixture catalyzed.

The ratio of isocyanate groups to isocyanate-reactive groups used in the reaction should be such that the resulting prepolymer has no free isocyanate-reactive groups but also that a reasonable advancement is obtained. Usually, the equivalent ratio of isocyanate groups to the isocyanate-reactive groups will reside in the range from 1.2:1 to 2:1, for example 1.4:1 to 1.6:1.

As noted above the one component adhesive composition of the present invention may further comprise an activator or catalyst—in an amount up to 20% by weight or from 0.1 to 5% by weight of the adhesive composition—which is known to promoting the cure of polyurethanes in the presence of moisture. Suitable catalysts include metal salts such as tin carboxylates, organo silicon titanates, alkyl titanates, bismuth carboxylates, and dimorpholinodiethyl ether or alkyl-substituted dimorpholinodiethyl ethers. Preferred catalysts include bismuth octoate, dimorpholinodiethyl ether and (di-(2-(3,5-dimethylmorpholino)ethyl)) ether.

As is known in the art, the adhesive composition may be formulated with fillers and additives to modify the compositions physical properties, such as viscosity flow rates and the like. To prevent premature curing of the polyurethane prepolymer, fillers and additives should be thoroughly dried before admixture therewith.

Reinforcing fillers may be added to the adhesive composition, usually in an amount of from 0.1 to 40% or from 0.1 to 30% by weight of the adhesive composition, to modify its thixotropic properties and to increase the strength of the resultant adhesive. Such fillers are well known to those skilled in the art and include carbon black, titanium dioxide, calcium carbonate, surface treated silicas, titanium oxide, fume silica, talc, and the like.

The further additives or adjunct materials which may be included in the present invention include: clays, such as particulate kaolin, surface treated kaolin, calcined kaolin, aluminum silicates and surface treated anhydrous aluminum silicates; plasticizers, such as alkyl phthalates, partially hydrogenated terpene, trioctyl phosphate, epoxy plasticizers, toluene-sulfamide, chloroparaffins, adipic acid esters, castor oil, toluene and alkyl naphthalenes; stabilizers, such as diethyl malonate and alkylphenol alkylates; thixotropes; ultraviolet stabilizers; particulate rubber materials; microbiocides; flame-proofing agents; and, antioxidants. The suitable or desirable amounts of these additives will be well known to a person of ordinary skilled in this art but it will be unusual for any given additive class to be present in an amount greater than 10% by weight of the adhesive composition.

The adhesive composition of this invention may be formulated by blending the components together using suitable means and preferably in an inert atmosphere devoid of oxygen and moisture. Once the adhesive composition is formulated, it is packaged in a suitable container such that it is also protected from atmospheric moisture and oxygen.

Substrate

Whilst lignocellulosic substrates with poorly defined geometry—such as chipboards, fiberboards and particleboards—may be adhered in the present invention in preparing lignocellulosic composites, the preferred lignocellulosic substrates include whole boards, half-edged boards, squares, wood strips and/or wood veneers which have been cut or shaped for the purposes of being fitted together in a definite and pre-determined relative geometric relationship in the final composite structure. Concomitantly, the preferred lignocellulosic composites are laminates containing at least two wood boards, half-edged boards, squares, wood veneers or wood strips that have been laminated together.

Any wood species that is capable of being bonded with the aid of polyisocyanate-based adhesive compositions may be used with the aqueous primer composition described herein. As examples of suitable wood species, Southern pines, Australian Slash pines, Ponderosa pines, Western White pines, Larch, Eucalyptus, Ash, Beech, Birch, coastal Douglas fir and inland Douglas fir may be mentioned. Particularly preferred wood species include Southern Yellow pine (SYP) and Douglas fir (DF). Combinations of these species may optionally be used in preparing a given lignocellulosic composite article, but it is generally preferred to use one species alone.

In one embodiment wood boards that have been chemically treated, for example acetylated wood (that is wood treated with acetic anhydride) may be adhered using the disclosed adhesive and primer. This is particularly useful to laminate or finger joint a plurality of acetylated wood boards to form a structure such as a wood beam.

In an embodiment, the air-dry density of the wood to be bonded is higher than 0.55 g/cm$^3$ and preferably higher than 0.6 g/cm$^3$.

Woods which have been aged for a long period, which have been dried at high temperatures or which have been over-dried can have reduced hygroscopicity and can exhibit reduced wettability: the substrate surface may be inactivated by these treatments, which can also bring wood extractives to the surface which might detrimentally affect later substrate adhesion. It is therefore preferred for the lignocellulosic substrates to have been subjected to low temperature drying techniques, such as drying at below 150° C. or freeze-drying. Alternatively or additionally, the lignocellulosic substrate may be pre-treated prior to the application of the primer composition thereto to remove any inactivated surface layers and/or remove extractives. The effectiveness of a given pre-treatment in improving the wettability of the substrate surface is dependent on the wood species but may include: brushing and/or planing the surface; treatment of the surface with polar and non-polar solvents; and, chemical treatment with sodium hydroxide, calcium hydroxide, nitric acid, and hydrogen peroxide.

Methods

The primer composition may applied by conventional application methods such as flooding, dipping, brushing, roll coating, doctor-blade application, printing methods, air-atomized spray, air-assisted spray, airless spray, high volume low pressure spray, air-assisted airless spray and high-speed rotation bell.

The viscosity of the primer composition may be from 0.005 to 1 Pa·s (50 cps to 1000 cps), as measured using a Brookfield viscometer at 25° C. As would be recognized by a skilled practitioner, the viscosities which are appropriate for different application methods vary considerably. In any event, the primer composition should generally be applied to the surface(s) to be bonded in an amount of from 1 to 50 g/m$^2$, preferably from 5 to 30 g/m$^2$, more preferably from 10 to 25 g/m$^2$.

The primer composition should be allowed to penetrate the surface before the application of the adhesive thereto. The appropriate penetration time will depend on the amount of primer composition applied and the density, moisture content and morphology of the lignocellulosic material. Generally a penetration time of up to 15 minutes—for example of from 1 to 10, or from 1 to 5 minutes—should be allowed under standard conditions (20° C., 65% Relative Humidity). However, it is noteworthy that good adhesion results have been obtained upon adhesive application after 6 hours and even up to 48 hours after the application of the primer.

The adhesive composition according to the present invention can similarly be applied by any conventional methods known in the art. For example, the adhesive composition can be applied to substrates by machine roll coating, manual roll coating or manual brush coating. In any event, the adhesive composition should generally be applied to the surface(s) to be bonded in an amount of from 50 to 500 g/m$^2$, preferably from 75 to 300 g/m$^2$, more preferably from 100 to 250 g/m$^2$.

After the adhesive composition and primer composition have been applied to the substrates to be bonded, the surfaces of these substrates are placed into adhesive contact, preferably under conditions that maximize the overlap of the polyisocyanate adhesive with the areas that have been treated with the primer composition. The formation of the adhesive bond may be facilitated by applying pressure to substrates, for instance a clamping pressure, to bring them into more intimate contact. Heat may be applied independently from or together with pressure to accelerate the curing of the polyurethane adhesive. For the same purpose, it is also envisaged that moisture may be added to one or more the surfaces to be bonded.

The achievement of an optimal adhesive bond will depend inter alia on the formulation of the polyurethane adhesive, the nature of the substrates to be bonded, the type of composite being produced, and the level and distribution of both the adhesive and aqueous primer compositions. A person of ordinary skill in the art may select the appropriate curing conditions—which combination of heat, moisture and pressure—to optimize the adhesive bond.

As is known in the art, the substrates may be heated in an oven or heating press, by irradiation, or via streams of hot air or steam; combinations of these techniques may also be used. It is however preferred that the adhesive bond is formed at ambient temperature without external heating, that is by "cold curing".

The following examples are illustrative of the present invention, and are not intended to limit the scope of the invention in any way.

EXAMPLES

The following materials are used in the Examples:

Tween® 20 is an ethoxylated (20) sorbitan ester based on a natural fatty acid (lauric acid), having an average hydroxyl value of 100 mg KOH/g and HLB of 16.7, available from Croda International.

Tween® 81 is an ethoxylated (5) sorbitan ester based on a natural fatty acid (oleic acid), having an average hydroxyl value of 140 mg KOH/g and an HLB value of 10, available from Croda International.

Surfynol PSA-336 is 7-(2-hydroxyethoxy)-2,4,7,9-tetramethyldec-5-yn-4-ol, available from Air Products and Chemicals.

Primer A consists of: 1 weight % Surfynol PSA-336; and 99% by weight of tap water.

Primer B consists of: 5% by weight of Tween® 20; 1% by weight of Surfynol PSA-336; and 94% tap water.

Primer C consists of: 5% by weight of Tween® 20; and, 95% by weight of tap water.

Primer D consists of: 0.5% by weight Surfynol PSA-336; and, 99.5% by weight of tap water.

Primer E consists of: 3.5% by weight of Tween® 81; and, 96.5% by weight of tap water.

Adhesive K1 comprises a methylene diisocyanate (MDI) based prepolymer, said adhesive composition being characterized by: 20% by weight NCO content; a Brookfield viscosity of 25,000 MPa·s as measured at 20° C. with a Spindle 6 after 1 minute rotation; an average isocyanate functionality of 2.8 and an open time of 60 minutes.

Adhesive K2 comprises a methylene diisocyanate (MDI) based prepolymer, said adhesive composition being characterized by: 16% by weight NCO; a Brookfield viscosity of 24,000 mPa·s*s at 20° C. as measured at 20° C. with a Spindle 6 after 1 minute rotation; and, an open time of 30 minutes.

Example 1

Six pairs of Douglas Fir samples (specific gravity 0.59; 0-10% growth ring angle) were provided having the dimensions 19×60×400 mm and meeting the requirements set by Canadian Standard CSA 112.9 for structural use. These samples were conventionally planed in the laboratory.

Primer C was applied at a 20 g/m² spread to the gluing faces of three pairs of mating surfaces. No primer was applied to the gluing faces of the remaining three pairs of mating surfaces. After allowing a primer penetration times of 5 minutes where applicable, adhesive K1 was then applied in amounts of 200 g/m², 160 g/m² and 120 g/m² respectively to 3 primed sides and 3 un-primed sides to be mated. The mating surfaces were brought together and the thus assembled parts were pressed at 0.8 MPa for 4 hours at room temperature.

The mated samples were stored for 7 days at 20° C. and 65% relative humidity to ensure full adhesive cure. Wood samples for each variable were then cut into small pieces and subjected to a Vacuum Pressure Soak test based on CSA 112.9 norms. Seven pieces were tested for each variable and the results averaged. These averaged test results are given in Table 1 below.

TABLE 1

| Sample | 1 | 2 | 3 | 4 | 5 | 6 |
|---|---|---|---|---|---|---|
| Primer Spread (g/m²) | 20 | 20 | 20 | 0 | 0 | 0 |
| Adhesive Spread (g/m²) | 200 | 160 | 120 | 200 | 160 | 120 |
| Shear Strength (MPa) | 9.40 | 9.27 | 9.35 | 8.93 | 8.93 | 8.78 |
| Wood Failure (%) | 96 | 92 | 97 | 57 | 58 | 55 |

The results clearly indicate the benefits of employing the primer composition.

Example 2

4 pairs of wooden surfaces, each composed of Southern Yellow Pine were provided. No primer was applied to the first mating pair. To the remaining three pairs, Primer C was applied at a spread of from 20 to 30 g/m² on both sides of the wood which were to be mated. After allowing primer penetration times of 5 minutes, 1 hour and 8 hours respectively, adhesive was then applied in an amount of 200 g/m² to all 8 sides to be mated. The mated or assembled parts were pressed at 0.8-1 MPa during 3 to 4 hours at room temperature.

The delamination resistance (%) was then investigated in accordance with Procedure B of EN 391. The results obtained for the first mating surfaces (no primer) and the second mating surfaces are illustrated in, respectively, Tables 2 and 3 below:

TABLE 2

| Adhesive K1 without Primer | | | | | |
|---|---|---|---|---|---|
| | Delamination (%) based on EN 391 Procedure B | | | | |
| Glueline | Probe 1 | Probe 2 | Probe 3 | Probe 4 | Average |
| Glueline 1 | 3 | 4 | 5 | 12 | 6 |
| Glueline 2 | 4 | 11 | 8 | 2 | 6 |
| Glueline 3 | 3 | 6 | 0 | 5 | 3 |
| Glueline 4 | 6 | 17 | 13 | 3 | 10 |
| Total Average | | | | | 6 |

TABLE 3

Adhesive K1 with Primer C, 5 minutes penetration time

| | Delamination (%) based on EN 391 Procedure B | | | | |
|---|---|---|---|---|---|
| Glueline | Probe 1 | Probe 2 | Probe 3 | Probe 4 | Average |
| Glueline 1 | 0 | 0 | 0 | 0 | 0 |
| Glueline 2 | 6 | 0 | 2 | 0 | 2 |
| Glueline 3 | 0 | 0 | 2 | 0 | 0 |
| Glueline 4 | 0 | 0 | 0 | 4 | 1 |
| Total Average | | | | | 1 |

Tables 2 and 3 clearly indicate the benefits of using primer on the delamination resistance of 1 component FUR on Southern Yellow Pine.

The results obtained for the third mating surfaces (60 minutes penetration time) and the fourth mating surfaces (8 hours penetration time) are illustrated in, respectively, Tables 4 and 5 below:

TABLE 4

Adhesive K1 with Primer C, 60 minutes penetration time

| | Delamination (%) based on EN 391 Procedure B | | | | |
|---|---|---|---|---|---|
| Glueline | Probe 1 | Probe 2 | Probe 3 | Probe 4 | Average |
| Glueline 1 | 0 | 0 | 0 | 0 | 0 |
| Glueline 2 | 0 | 0 | 4 | 8 | 3 |
| Glueline 3 | 0 | 0 | 5 | 0 | 1 |
| Glueline 4 | 2 | 0 | 0 | 3 | 1 |
| Total Average | | | | | 1 |

TABLE 5

Adhesive K1 with Primer C, 8 hours penetration time

| | Delamination (%) based on EN 391 Procedure B | | | | |
|---|---|---|---|---|---|
| Glueline | Probe 1 | Probe 2 | Probe 3 | Probe 4 | Average |
| Glueline 1 | 0 | 0 | 0 | 0 | 0 |
| Glueline 2 | 47 | 0 | 0 | 0 | 12 |
| Glueline 3 | 0 | 2 | 2 | 0 | 1 |
| Glueline 4 | 0 | 0 | 4 | 0 | 1 |
| Total Average | | | | | 3 |

As shown by Tables 4 and 5 the benefits in delamination resistance can be retained even where the primer has been applied 8 hours prior to the polyurethane adhesive.

Example 3

Southern Yellow Pine (specific gravity of 0.55-0.65) planks were provided having the dimensions 20 mm thick by 135 mm wide. These planks were planed in the laboratory.

To a first pair, Primer C (5 wt. % Tween™ 20) was applied at a spread of 20 g/m² to both sides of the wood which were to be mated. To a second pair Primer C (5 wt. % Tween™ 20) was applied at a spread of 10 g/m² to both sides of the wood which were to be mated. In the same manner, two further pairs were then prepared at a primer spread rate of 10 g/m² but using diluted versions of the primer. After allowing for primer penetration times of 5 minutes in each instance, adhesive was then applied one-sided in an amount of 180-200 g/m² and the mating surfaces brought together. The so-assembled parts were pressed at 0.8 MPa with a hydraulic press for 4 hours at room temperature to ensure full adhesive cure.

The wood samples were cut into 100×125×75 mm pieces and tested for delamination resistance according to European Standard EN 391 Process B. The averaged results for 4 pieces of each wood sample are shown in Table 6 below.

TABLE 6

| | Sample | | | |
|---|---|---|---|---|
| | 1 | 2 | 3 | 4 |
| Tween 20 Concentration in Primer C (% wt) | 5 | 5 | 3 | 1 |
| Primer Application (g/m²) | 20 | 10 | 10 | 10 |
| Total Delamination (%) | 3.1 | 5.3 | 3.6 | 5.9 |

Example 4

This example shows the effectiveness of a variety of primers (A, B and C) in improving the durability of an adhesive on Southern Yellow pine species (specific gravity 0.62).

The respective primers were applied with a brush at a spread of 20 g/m² on both wood sides to be glued. A penetration time of 10 minutes was then allowed, following which adhesive was applied one-sided in an amount of 190-200 g/m² and the mating surfaces brought together.

The so-assembled articles were stored at 20° C. and 65% Relative Humidity for a targeted wood humidity of 11-12 wt. %. The gluing was carried out at 0.8 MPa pressure for 4 hours. The wood samples were cut into 100×125×75 mm pieces and tested for delamination resistance according to European Standard EN 391 Process B. The averaged results for 4 pieces of each article are shown in Table 7 below.

TABLE 7

| | Primer | | |
|---|---|---|---|
| | A | B | C |
| Total Delamination (%) | 4.3 | 1.8 | 4.6 |

Example 5

This example shows the improvement in durability of an adhesive employed on a plurality of high density wood species which is achieved by using a variety of primers (B, C and D) in accordance with the present invention.

The respective primers were applied with a brush at a spread of 20 g/m² on both wood sides to be glued. A penetration time of 15 minutes was then allowed.

Adhesives K1 and K2 were applied one-sided in an amount of 150-160 g/m² and 180-200 g/m² respectively and the mating surfaces brought together. All wood species were stored at 20° C. and 65% relative humidity to achieve a targeted wood humidity of 11-12%. Gluing was carried out at 0.8 MPa pressure with a hydraulic press for 2-3 hours.

The wood samples were cut into 100×125×75 mm pieces and tested for delamination resistance according to European Standard EN 391 Process B. The averaged results for 4 pieces of each wood sample are shown in Table 8 below.

TABLE 8

| Wood Type | Wood Specific Gravity | Adhesive Applied | Total Delamination (%) | | | |
|---|---|---|---|---|---|---|
| | | | No Primer | B | C | D |
| Douglas Fir | 0.52 | K1 | 43 | 1 | — | 16 |
| Douglas Fir | 0.52 | K2 | 47 | 4 | — | — |
| Southern Yellow Pine | 0.64 | K1 | 32 | | 1 | |
| Southern Yellow Pine | 0.66 | K1 | 56 | 3 | — | 11 |
| Eucalyptus | 0.87 | K2 | 13.8 | 5 | 6.7 | |
| Ash | 0.66 | K2 | 30 | 4 | — | 14 |
| Beech | 0.70 | K2 | 69 | 8 | — | 5 |
| Birch | 0.65 | K2 | 48 | 0 | — | 0 |

Example 6

This example illustrates that surfactants having different HLB values and OH numbers may also be effective when used as primers, here on Southern Yellow pine species (specific gravity 0.60-0.71).

Primers C and E have been prepared using different surfactants but at concentrations such that the OH content of both aqueous compositions is equivalent. It is noted that Tween® 81 gave a milky but stable dispersion when mixed in water.

The respective primers were applied with a brush at a spread of 20 g/m² on both wood sides to be glued. A penetration time of 10 minutes was then allowed, following which adhesive K1 was applied one-sided in an amount of 160-180 g/m² and the mating surfaces brought together.

The so-assembled articles were stored at 20° C. and 65% Relative Humidity for a targeted wood humidity of 11-12 wt. %. The gluing was carried out at 0.8 MPa pressure for 4 hours. The wood samples were cut into 100×125×75 mm pieces and tested for delamination resistance according to European Standard EN 391 Process B. The averaged results for 4 pieces of each article are shown in Table 9 below.

TABLE 9

| | Primer | | |
|---|---|---|---|
| | None | C | E |
| Total Delamination (%) | 31.8 | 2.0 | 2.5 |

Example 7

Adhesive bonds were made using the disclosed adhesive and primer and acetylated wood. The adhesive bonds were tested using type I and type II block shears, as defined by ASTM D 5751, as well as the delamination portion of ASTM D 2559. The inventive adhesive used in these tests is Adhesive K1. The inventive primer used in all tests is Primer C.

The Acetylated Southern pine boards used were commercially available products. The boards were pre- and post conditioned to approximately 5% moisture. The boards were planed and primer was added to the planed face of each board at 25 grams/square meter (of a 5% solution) within 1 hour of planing the board. The primed faces of both boards were coated with adhesive coated at application rates of 40 lbs/MSF 20 minutes after primer application. Open time was 1-2 minutes and closed assembly time was generally 3-5 minutes. Samples were pressed for 4 hours at 150 PSI and then allowed to post cure for 1 week prior to block shear and delamination testing.

A summary of block shear results is shown below along with the values obtained for comparative tests (comp 1-4) using commercial adhesive samples.

TABLE 10

Type I Exterior Block Shear Test Results - acetylated wood

| Adhesive | Dry Bonds | | Pressure Soak | | Boils | | Elevated Temperature | |
|---|---|---|---|---|---|---|---|---|
| | shear (PSI) | Wood Tear (%) | shear (PSI) | Wood Tear (%) | shear (PSI) | Wood Tear (%) | shear (PSI) | Wood Tear (%) |
| inventive primer + adhesive | 1708 | 93 | 1591 | 91 | 1010 | 80 | 1091 | 83 |
| comp 1 | 945 | 43 | 789 | 8 | 436 | 7 | 675 | 16 |
| comp 2 | 1282 | 64 | 792 | 1 | 445 | 7 | 713 | 23 |
| comp 3 | 1311 | 89 | 955 | 42 | 629 | 38 | 941 | 79 |
| comp 4 | 1345 | 83 | 991 | 27 | 728 | 40 | 1008 | 77 |
| Spec. | 943 | 60 | 803 | 50 | 803 | 50 | 642 | 40 |

1 Purweld 1302 adhesive available from Henkel Corporation.
2 Purbond HB 712 adhesive available from Henkel Corporation.
3 Purbond HB E452 adhesive available from Henkel Corporation.
4 Purbond GT adhesive available from Henkel Corporation.

Type I tensile strength (PSI) and wood tear (%) levels for the inventive adhesive/primer were well above the specification requirements under all four exposure conditions. Conversely, none of the commercial adhesives analyzed met wood tear (%) requirements under either boil or pressure soak conditions, or shear strength (PSI) levels after boil exposure conditions. Note that the wood tear specification is a minimum average number.

TABLE 11

Type II Interior Block Shear Test Results - acetylated wood

| Adhesive | Dry Bonds | | 3 Cycle Soak | | Elevated Temperature | |
|---|---|---|---|---|---|---|
| | shear (PSI) | Wood Tear (%) | shear (PSI) | Wood Tear (%) | shear (PSI) | Wood Tear (%) |
| inventive primer + adhesive | 1708 | 93 | 1100 | 86 | 1091 | 83 |
| comp 1 | 945 | 43 | 690 | 32 | 675 | 16 |
| comp 2 | 1282 | 64 | 513 | 11 | 713 | 23 |
| comp 3 | 1311 | 89 | 1055 | 55 | 941 | 79 |
| comp 4 | 1345 | 83 | 1033 | 80 | 1008 | 77 |
| Spec. | 943 | 60 | 482 | 30 | 642 | 40 |

Note:
the specification requirements used were for standard Southern pine as listed in ASTM D 2559 and adjusted for a moisture content of 5%.
1 Purweld 1302 adhesive available from Henkel Corporation.
2 Purbond HB 712 adhesive available from Henkel Corporation.
3 Purbond HB E452 adhesive available from Henkel Corporation.
4 Purbond GT adhesive available from Henkel Corporation.

Two acetylated ASTM D2559 blocks were tested as part of this set. A summary of delamination results for these blocks along with the values obtained for comparative tests using commercial adhesive samples.

TABLE 12

ASTM D 2559 Delamination Test Results (40 lbs/MSF) - acetylated wood

| Adhesive | Test Block #1 | Test Block #2 |
|---|---|---|
| inventive primer + adhesive | 0.6 | 1.0 |
| comp 1 | 20.8 | 21.3 |
| comp 2 | 33.8 | 31.2 |
| comp 3 | 13.4 | 12.5 |
| comp 4 | 14.2 | 12.3 |

1 Purweld 1302 adhesive available from Henkel Corporation.
2 Purbond HB 712 adhesive available from Henkel Corporation.
3 Purbond HB E452 adhesive available from Henkel Corporation.
4 Purbond GT adhesive available from Henkel Corporation.

Like the block shear results, the inventive primer/adhesive system provides outstanding delamination performance.

Individual results for acetylated wood bonded using the inventive adhesive/primer system are shown in the following Tables.

TABLE 13

Individual Type I Block Shear Results
Individual ASTM D5751 Type I Block Shear Results - acetylated wood

| Test | Room Temperature | | Pressure Soaks | | Boils | | Elevated Temperature | |
|---|---|---|---|---|---|---|---|---|
| | shear (PSI) | Wood Tear (%) | shear (PSI) | Wood Tear (%) | shear (PSI) | Wood Tear (%) | shear (PSI) | Wood Tear (%) |
| 1 | 1652 | 100 | 1370 | 100 | 965 | 90 | 1031 | 90 |
| 2 | 1945 | 80 | 1645 | 90 | 775 | 75 | 1092 | 75 |
| 3 | 1673 | 95 | 1460 | 95 | 1105 | 90 | 1490 | 95 |
| 4 | 1562 | 95 | 1483 | 95 | 936 | 75 | 1021 | 90 |
| 5 | — | — | 1314 | 95 | 1209 | 80 | 1198 | 80 |
| 6 | — | — | 1612 | 95 | 655 | 85 | 1104 | 70 |
| 7 | — | — | 1930 | 90 | 904 | 60 | 992 | 85 |
| 8 | — | — | 1782 | 70 | 1147 | 95 | 829 | 85 |
| 9 | — | — | 1722 | 85 | 1392 | 70 | 1065 | 80 |
| Avr. | 1708 | 93 | 1591 | 91 | 1010 | 80 | 1091 | 83 |
| S.D. | 165 | 9 | 202 | 9 | 227 | 11 | 180 | 8 |
| Spec. | 943 | 60 | 803 | 50 | 803 | 50 | 642 | 40 |

TABLE 14

Individual Type II Block Shear Results
Individual ASTM D5751 Type II Block Shear Results - acetylated wood

| test | Room Temperature | | 3 Cycle Soaks | | Elevated Temperature | |
|---|---|---|---|---|---|---|
| | shear (PSI) | Wood Tear (%) | shear (PSI) | Wood Tear (%) | shear (PSI) | Wood Tear (%) |
| 1 | 1652 | 100 | 1336 | 70 | 1031 | 90 |
| 2 | 1945 | 80 | 1240 | 80 | 1092 | 75 |
| 3 | 1673 | 95 | 1389 | 95 | 1490 | 95 |
| 4 | 1562 | 95 | 1011 | 85 | 1021 | 90 |
| 5 | | | 1458 | 95 | 1198 | 80 |
| 6 | | | 745 | 90 | 1104 | 70 |
| 7 | | | 760 | 85 | 992 | 85 |
| 8 | | | 960 | 90 | 829 | 85 |
| 9 | | | 1003 | 80 | 1065 | 80 |
| Avr. | 1708 | 93 | 1100 | 86 | 1091 | 83 |
| S.D. | 165 | 9 | 266 | 8 | 180 | 8 |
| Spec. | 943 | 60 | 482 | 30 | 642 | 40 |

TABLE 15

Breakdown of ASTM D2559 Delamination Block Glue Line Performance Acetylated wood delamination Results for Primer C/Adhesive K1

| Application | Block #1 | | Block #2 | |
|---|---|---|---|---|
| (40 lbs/MSF) | Left Side | Right Side | Left Side | Right Side |
| 1st Glue Line | 0.0 | 0.0 | 0.0 | 0.0 |
| 2nd Glue Line | 0.2 | 0.2 | 0.6 | 0.0 |
| 3rd Glue Line | 0.0 | 0.0 | 0.0 | 0.2 |
| 4th Glue Line | 0.0 | 0.0 | 0.0 | 0.2 |
| 5th Glue Line | 0.0 | 0.2 | 0.0 | 0.0 |
| Overall Total | 0.6 | | 1.0 | |

The 1 part inventive adhesive in combination with the disclosed primer provided ASTM D5751 type I strength (PSI) and wood tear (%) levels superior to that of other commercial 1 part and 2 part adhesives. Similarly, the inventive adhesive/primer gave exceptional delamination performance under ASTM D2559 conditions.

What is claimed is:

1. An adhesive system for preparing and bonding lignocellulosic surfaces into lignocellulosic composites comprising:
    an aqueous primer composition; and,
    a polyurethane adhesive composition,
    wherein said aqueous primer composition consists of:
        water
        up to 10 wt. % of surfactant selected from the group consisting of water soluble surfactants, water emulsifiable surfactants and mixtures thereof; and,
        from 0 to 25 wt. %, by weight of the composition, of a polyol selected from the group consisting of water soluble polyols, water dispersible polyols, water emulsifiable polyols and mixtures thereof, wherein said polyols have a molecular weight less than 5000 daltons,
        from 0 to 10 wt. % of co-solvent;
        with the proviso that the aqueous primer composition must comprise at least one of said polyol or surfactant having hydroxyl functionality and a molecular weight less than 5000 daltons.

2. The adhesive system according to claim 1, wherein said aqueous primer composition consists of:
    up to 5 wt. % by weight of the composition, of said surfactant selected from the group consisting of water soluble surfactants, water emulsifiable surfactants and mixtures thereof; and,
    up to 20 wt. % by weight of the composition, of said polyol selected from the group consisting of water soluble polyols, water dispersible polyols, water emulsifiable polyols and mixtures thereof;
    from 0 to 10 wt. % of co-solvent; and
    water.

3. The adhesive system according to claim 1, wherein said primer composition consists of at least 80 wt. % of water.

4. The adhesive system according to claim 1, wherein said surfactant of the primer composition is selected from the group consisting of: siloxane based surfactants; alkyl polyglucosides, including alkylpolysaccharides; alkoxylated fatty acids; alkoxylated alcohols; alkylsufosuccinates; acetylenic diols; and, mixtures thereof.

5. The adhesive system according to claim 1, wherein said surfactant of the primer composition is selected from surfactants having a number average molecular weight (Mn) of from 400 to 25000, as determined by means of gel permeation chromatography against a polystyrene standard.

6. The adhesive system according to claim 1, wherein said polyol of the primer composition comprises at least one di- or polyfunctional hydroxy or polymeric compound which is stable at 120° C. and has a molecular weight of less than 2000 daltons.

7. The adhesive system according to claim 1, wherein said polyol of the primer composition has a hydrophilic-lipophilic balance (HLB) of at least 10.

8. The adhesive system according to claim 1, wherein said polyurethane adhesive composition is a moisture-curable, one-component polyurethane adhesive composition.

9. The adhesive system according to claim 8, wherein the one-component polyurethane adhesive composition comprises:
    a prepolymer having free NCO groups, said prepolymer being the reaction product of at least one component A comprising a compound reactive toward isocyanates and at least one component B comprising an isocyanate;
    from 0 to 40% by weight of a filler;
    from 0 to 20% by weight of customary additives and assistants; and,
    from 0 to 20% by weight of an activator.

10. The adhesive system according to claim 9, wherein said prepolymer having free NCO groups is characterized by:
    i) an NCO content of from 5 to 30% based on the prepolymer;
    ii) a functionality of from 2.2 to 3; and,
    iii) a viscosity at 20° C. of from 300 to 35,000 mPa·s.

11. The adhesive system according to claim 1 wherein said primer composition has a pH of 6 to 8.

12. An adhesive bonded lignocellulosic composite structure consisting of wood and the adhesive system according to claim 1.

13. A process for preparing a lignocellulosic bonded composite structure comprising the steps of:
    (a) providing at least two lignocellulosic surfaces;
    (b) providing an adhesive system as defined in claim 1;
    (c) applying said adhesive system to at least a portion of at least one of the lignocellulosic surfaces; and
    (d) contacting the at least one lignocellulosic surface with another lignocellulosic surface under conditions suitable for forming an adhesive bond there-between.

14. The process according to claim 13, wherein said step c) of applying said adhesive system comprises:
    applying the primer composition to at least a portion of at least one of the lignocellulosic surfaces; and,
    after a period of from 1 to 15 minutes applying said polyurethane adhesive composition to said portion(s) of the lignocellulosic surface(s).

15. An adhesive bonded lignocellulosic composite structure obtained by the process defined in claim 13.

16. The lignocellulosic composite structure according to claim 15 which meets the requirements of European Standard EN 391:2001 and/or Canadian Standard Association (CSA) Standard 112.9.

17. The lignocellulosic composite structure according to claim 15 comprising acetylated wood.

18. The lignocellulosic composite structure according to claim 15 which meets the requirements of ASTM D2559.

* * * * *

UNITED STATES PATENT AND TRADEMARK OFFICE
CERTIFICATE OF CORRECTION

PATENT NO. : 9,649,826 B2  Page 1 of 1
APPLICATION NO. : 14/450561
DATED : May 16, 2017
INVENTOR(S) : Frank Swiezkowski et al.

It is certified that error appears in the above-identified patent and that said Letters Patent is hereby corrected as shown below:

In the Specification

Column 4, Lines 12 & 13: Change "SpecOcations" to -- Specifications --.

Column 8, Line 27: Change "rhamose" to -- rhamnose --.

Column 8, Line 31: Change "methyl-hexa glucoside" to -- methyl-hexo glucoside --.

Column 17, Line 15: Change "FUR" to -- PUR --.

Signed and Sealed this
Eighth Day of May, 2018

Andrei Iancu
*Director of the United States Patent and Trademark Office*